Aug. 3, 1937.  J. H. BUCKNAM ET AL  2,089,015
CONTROL SYSTEM FOR WELDING AND CUTTING MACHINES
Filed Oct. 5, 1935  3 Sheets-Sheet 3
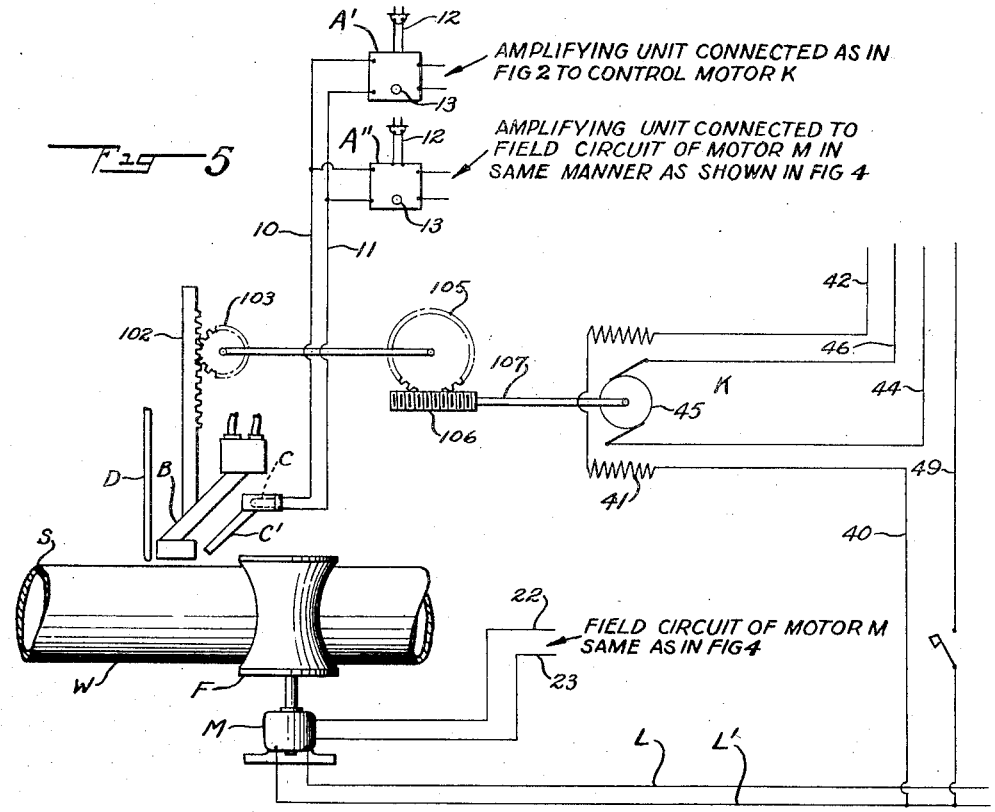
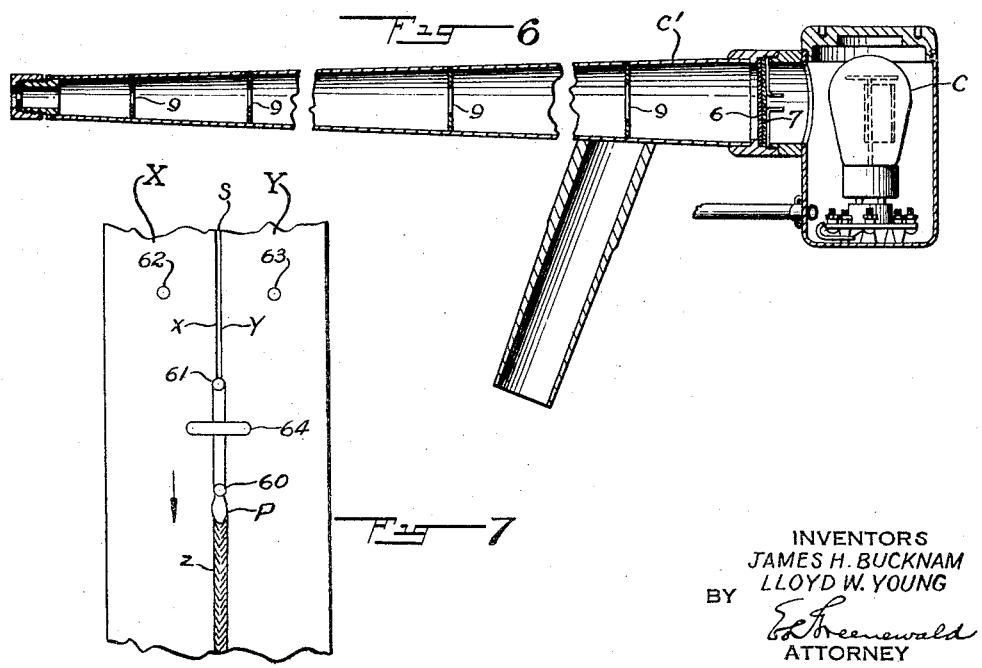
INVENTORS
JAMES H. BUCKNAM
LLOYD W. YOUNG
ATTORNEY Patented Aug. 3, 1937

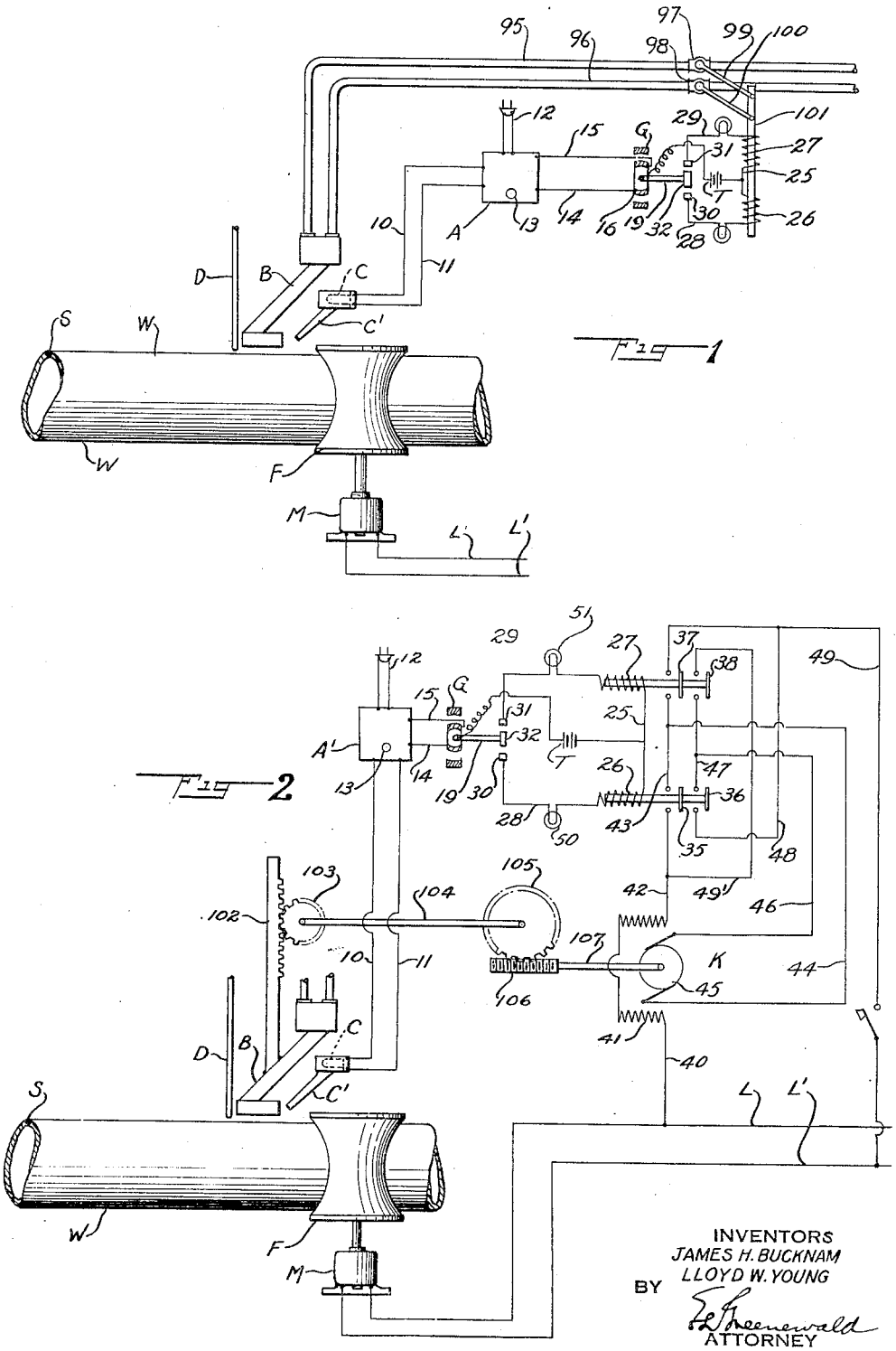

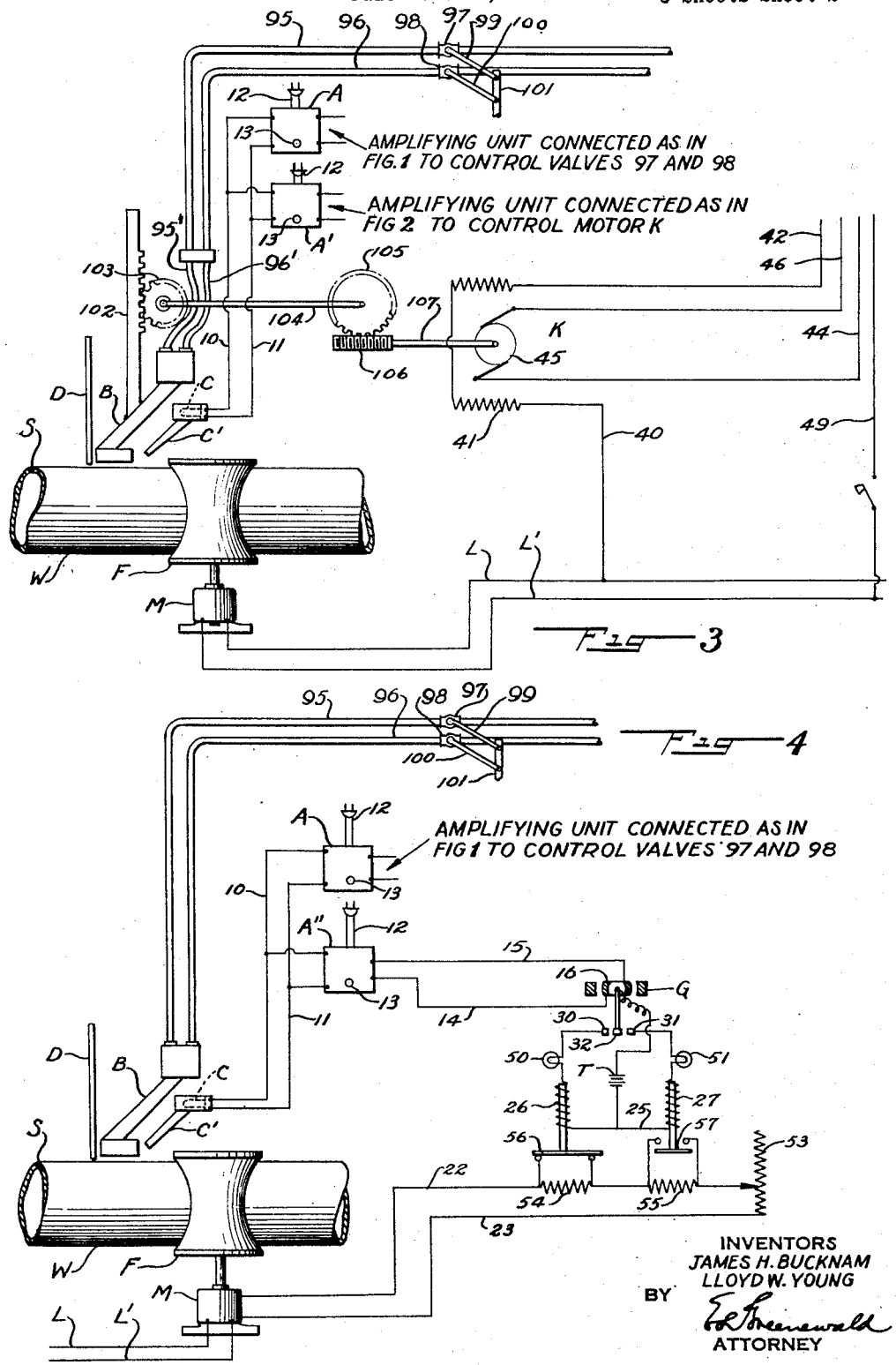

2,089,015

UNITED STATES PATENT OFFICE 2,089,015

CONTROL SYSTEM FOR WELDING AND CUTTING MACHINES

James H. Bucknam, Cranford, and Lloyd W. Young, Scotch Plains, N. J., assignors, by mesne assignments, to Union Carbide and Carbon Corporation, a corporation of New York Application October 5, 1935, Serial No. 43,768

20 Claims. (Cl. 113—59)

This invention relates to systems for controlling the welding and cutting of metals, and constitutes a continuation in part of application Serial No. 542,963, filed June 8, 1931.

In the fusion welding of metals by means of the oxyacetylene flame or the electric arc, as in production or machine welding, the weld produced is the resultant of a number of variable factors such as: the welding heat of the flame or the arc; the speed at which the work is fed relatively to the flame or arc; the chemical and metallurgical properties of the metal; the width of the gap between the edges being welded; and, when metal is to be fused and added to the seam, the rate at which a welding rod or a welding electrode is fed into the molten puddle, as well as the size and the properties of such rod or electrode. In order to produce a welded seam of predetermined high quality it is essential that these factors be very accurately correlated at every point along the seam.

Heretofore, in most types of automatic welding machines, the work-feeding speed and the heat are set at a predetermined standard at the start of a weld and are not changed during its progress. Hence, since the factors which contribute to produce the weld usually do not remain constant, unsatisfactory welds often result. In some welding machines, to compensate for such variations, the welding speed has been changed by an attendant whose manipulations are determined by his own judgments of the appearance of the weld, the welding heat, and other factors, while the weld is being made. When he concludes that a satisfactory weld is not being produced, the attendant again relies upon his judgment, making adjustments of the welding speed, the heating means, the welding rod feed, and so forth, in his effort to compensate for a change in one or more of these, hoping thereby to reestablish the combined condition that produces a weld of the required quality. There has been no definite relation between the attendant's adjustments and the predetermined welding conditions they aim to restore. Each attendant thus introduces a personal variable factor into the welding done by a machine under his care, because his control and manipulation depend mainly upon his acuteness and skill, which usually wane during the working day. Under these conditions it has been practically impossible to maintain a satisfactory correlation of all of the variable factors entering into a seam welding operation throughout its progress from the beginning to the end of a welded seam.

According to the present invention, human skill and judgment may be substantially eliminated from the welding operation and replaced by a control mechanism which constantly tends to restore the normal welding operation and is instantaneously sensitive and responsive to even the slightest changes in the various factors which cooperate to produce a weld of predetermined penetration and quality. We have determined that one dependable criterion of a substantially perfect weld is the condition of the highly heated or slightly melted metal edges immediately ahead of the welding point, or the condition of the weld at the time it is being produced and in a state of fusion; and that the radiant energy emitted by such highly-heated edges or such molten metal is one of the characteristics which may be utilized in maintaining the desired accurate correlation of the factors producing the condition that results in a substantially perfect weld. We find that a photoelectric cell, when focused on the highly-heated or fused metal adjacent to or at the welding point, may be employed as a medium for instantaneously detecting changes in the welding zone above or below a predetermined normal condition; and that invisible as well as visible light and heat effects of such changes (luminous and non-luminous energy radiations), too minute to be discerned by an attendant, will instantaneously produce corresponding variations in a predetermined normal photoelectric current. These variations, with or without amplification, may be utilized to control the welding mechanism and reestablish a predetermined normal welding condition.

In the application referred to above a system is described for controlling a welding operation by automatically or semi-automatically varying the speed at which the work is moved relatively to the welding means, i. e., the oxy-acetylene flame or the electric arc with or without a welding rod or welding electrode. The welding speed as well as the welding heat and other factors are adjusted at the beginning of the welding operation to produce a weld of predetermined high quality and correct penetration, after which the mechanism under the control of the photocell may be automatically or semi-automatically maintained in a condition to continuously produce the same result throughout the length of the seam.

The production of a uniform continuous weld may also be obtained by maintaining the work-feeding speed practically constant and appropriately varying the amount of heat supplied to the seam in forming the weld. In gas-flame welding this may be accomplished by varying the movement of the blowpipe and the work relatively to one another while maintaining the size of the blowpipe flame substantially constant, or the pressures of the gases supplied to the blowpipe may be controlled to vary the size of the blowpipe flames. In both of these instances, of course, the amount of heat applied to the seam is regulated in accordance with variations in the radiant energy emitted by the heated work and detected by suitable means, such as a photoelectric cell.

In addition to controlling a welding operation by regulating the work-feeding speed, the position of the blowpipe and its flame relative to the work, or the pressures of the gases supplied to the blowpipe, different combinations may be employed in certain instances. Thus it may be desirable to regulate the work-feeding speed and at the same time also vary the pressures of the welding gases or the distance between the blowpipe and the work; or to simultaneously vary the pressures of the welding gases and the distance between the blowpipe and the work.

A more detailed disclosure of the objects and novel features of our invention will be found in the following description and in the accompanying drawings, in which Fig. 1 diagrammatically illustrates a welding system embodying the present invention in which a welding operation may be controlled by regulating the supply of gases to a blowpipe;

Fig. 2 shows a modification of the welding system illustrated in Fig. 1 in which the position of a blowpipe and its flame with respect to the work may be controlled during a welding operation;

Fig. 3 illustrates a welding system combining the systems shown in Figs. 1 and 2 with portions of the electrical circuits omitted;

Fig. 4 is another modification of the system shown in Fig. 1 in which a welding operation is controlled by simultaneously regulating the work-feeding speed and the pressures of the gases supplied to the blowpipe;

Fig. 5 illustrates a further modification in which the welding operation is controlled by simultaneously regulating the work-feeding speed and the position of the blowpipe with respect to the work;

Fig. 6 is a view of the photocell unit with the focusing tube in section; and

Fig. 7 is a view diagrammatically illustrating a portion of a seam that is being welded.

Referring to Fig. 1, we have shown the principles of our invention applied to an apparatus for welding the longitudinal seam S of a tubular metal article, such as a steel barrel or pipe W. An oxy-acetylene or similar blowpipe B may furnish the high temperature heat required to heat and fuse the edges to be united and to fuse a welding rod D, if weld metal is to be added to form the joint. The welding rod may be fed to the welding zone by well-known mechanism (not shown). The work, such as the contiguous edges of the seam, may be progressively heated, as by moving the work and the welding means relatively to one another in a direction lengthwise of the seam to produce a continuous weld. As here shown, suitable feed rolls F, driven through appropriate gearing by an electric motor M, may engage opposite sides of the barrel W and propel the same so that the seam thereof will move past the relatively stationary blowpipe and the welding rod associated therewith.

To produce a continuous uniform weld of predetermined quality, we employ means variable proportionally and instantaneously in response to changes in a characteristic of the molten weld or of the highly-heated base metal adjacent thereto, and utilize such variations to actuate mechanism adapted to reestablish a condition that will insure welding of uniform quality at every point along the seam. Among the mediums adapted to detect and respond to these changes, we prefer to use a photoelectric cell which reacts to changes in the radiant energy emitted by the highly heated or melted metal at or adjacent to the welding point.

In Fig. 1, such a photocell C is arranged so that it may be focused on the highly heated metal and is preferably connected in circuit with a standard thermionic amplifier A. The amplifier A may be associated with suitable mechanism for controlling the pressures of the gases supplied to the blowpipe B to vary the size of the high temperature heating flame, the driving motor feeding the work W at a substantially constant speed.

As heat is applied to make a weld in steel, the color of the steel changes from black through the reds to almost a white at the melting point. As the temperature of the steel increases, red and infra-red rays are given off in increasing amounts; and, inasmuch as we may use a photocell that is very sensitive to the radiant energy corresponding to the red and infra-red zones of the spectrum, very slight changes in the condition at the weld may be instantaneously detected by such cell. The changes in the radiant energy conveyed from the work through the tube C' to the photocell C produce a proportional increase or decrease in the electrical energy passing through the cell. Sometimes particles of scale and other matter in the welding zone become highly luminous and emit a bright white light and possibly some ultra-violet light which may give a false signal to the photocell. To overcome this a filter screen may be placed in the tube C' adjacent to the photocell to permit only red and infra-red rays to pass to the cell, thus increasing its stability and working the cell more on heat rays than on light rays. This screen, as shown in Fig. 6, may be made of two pieces of glass, one clear glass 6 ground on one side to diffuse the rays going to the photocell, and the other of clear red glass 7 which screens out the short rays, including the ultra-violet. We may also insert a series of fixed diaphragms 9 in the light conveyor tube C' to prevent reflection from the walls of this tube.

The photocell C is connected through conductors 10 and 11 to the input terminals of a suitable direct current amplifying unit A, such as a Loftin-White, which may have a filament current supply connection 12 and an amplification control knob 13. The amplified electrical energy may be delivered through conductors 14 and 15 to the coil 16 of a relay G having a lever arm 19 adapted to be actuated by the coil 16. The lever arm 19 may be electrically connected through a battery T to a conductor 25 that has its opposite ends connected to solenoid coils 26 and 27 respectively. The other ends of these coils are connected by conductors 28 and 29 to contacts 30 and 31 on opposite sides of and alternatively engageable by a contact 32 on the lever arm 19.

When the welding is progressing according to the predetermined standard, the lever arm will be in its neutral position and the contact 32 will be out of engagement with both contacts 30 and 31; and the distances separating the lever arm contact from the other two may be such that infinitesimal variations will be ineffective to close the circuits they control. But when the lever arm contact 32 engages the contact 30, the coil 26 will be energized by current from the battery T; and the coil 27 will be similarly energized when the contact 31 is engaged by the lever arm contact 32.

These coils 26 and 27, when energized, operate mechanism designed to vary the pressure of the gases supplied to the blowpipe B. As shown, suitable gases such as oxygen and acetylene may be delivered to the blowpipe B through conduits 95 and 96. Valves 97 and 98 in the conduits 95 and 96 are provided to control the quantity of gases supplied to the blowpipe B, and these valves may be provided with operating handles 99 and 100 which are pivotally connected to a bar 101 adapted to serve as a core of a solenoid extending through the coils 26 and 27. The coils 26 and 27 are so arranged that current flows in one direction through coil 26 when the lever arm 19 engages contact 30, and in the opposite direction through coil 27 when the lever arm 19 engages contact 31. In this manner the bar 101 is moved up and down in accordance with variations in the radiant energy emitted by the heated work to regulate, through the amplifying unit A and relay G, the valves 97 and 98 so as to control the quantity of gases supplied to the blowpipe B. The motor M, which is connected to the supply lines L and L', may drive the work W at a substantially constant speed relatively to the blowpipe B.

When beginning the welding operation at one end of the seam, the several factors, such as the speed of the motor M, the welding rod feed, the position of the blowpipe, and the rate at which gases are supplied to the blowpipe B, are desirably adjusted in accord with previous experience and standards so as to cooperate in producing a weld at that point which has predetermined high quality and normal penetration. Although the effects of the several welding factors are integrated in the weld, one of these factors may be regulated in response to variations in the initial or desired condition of the weld, to produce a uniform weld throughout the length of the seam even though variations may arise from time to time in the other cooperating factors of the welding operation. Thus one of the factors, such as the quantity of heat supplied by the blowpipe B, may be varied as described above. Accordingly, when the light flux from the weld to the photocell decreases, the electrical output of the cell is decreased, causing the lever arm 19 to move to one side of its predetermined or neutral position. This indicates that sufficient heat is not applied to the seam and the circuit of one of the coils 26 or 27 is completed to move the bar 101 in such a direction that the valves 97 and 98 are opened to increase the quantity of gases supplied to the blowpipe B. Conversely, when the emitted light rays increase to an extent to cause the lever arm 19 to move to the other side of its neutral position, the circuit of the other coil is completed to move the bar 101 so as to close the valves and decrease the quantity of gases supplied to the blowpipe B. With such a control, a supply of welding heat can be readily obtained which will at all times result in a fully penetrated high quality uniform weld.

In Fig. 2 is illustrated a modification of the welding system shown in Fig. 1 in which the quantity of heat applied to the seam is regulated by varying the distance between the blowpipe flame and the seam being welded, and thereby control the weld quality while the work-feeding speed and the pressures of the gases remain constant, the blowpipe being adjusted toward and away from the work onto which it is directed as the emission of radiant energy from the heated work varies. This may be accomplished by control mechanism similar to that already described and may include a photocell C focused upon the heated metal, an amplifying unit A', and relay mechanism comprising the coils 26 and 27 connected to effect the reversal of the armature current of a control motor K which is adapted to move the blowpipe B toward or away from the work W. For moving the blowpipe B the latter may be secured to a movable rack 102 having teeth which engage a pinion 103 connected by a shaft 104 to a gear 105. A worm gear 106 which engages the gear 105 is carried by the armature shaft 107 of the control motor K.

The coil 26 simultaneously operates switches 35 and 36 adapted to electrically connect the field winding and the armature winding of the control motor K in circuit with the supply lines L, L', to cause the shaft of this motor to rotate clockwise; and the coil 27 similarly operates switches 37 and 38 to electrically connect the field and armature windings with the mains L, L' to cause a counter-clockwise rotation of the armature shaft. The worm 106 on this shaft constantly meshes with the gear 105, whereby the blowpipe may be moved toward or away from the work W, to either increase or decrease the quantity of heat applied to the seam.

Normally the lever arm 19 is in its neutral or mid position, the coil circuits are open, the motor K is idle, and the motor M is feeding the work W at a substantially constant speed to produce a weld of predetermined quality. Assuming that lever arm contact 32 engages the contact 30, the switches 35 and 36 will close and current will flow through the following path: Supply main L, conductor 40, field winding 41, conductor 42, switch 35, conductors 43 and 44, armature 45, conductors 46 and 47, switch 36, conductors 48 and 49, supply main L'. Similarly, assuming that the lever arm contact 32 engages the contact 31, the switches 37 and 38 will close and current will flow through the following path: Supply main L, conductor 40, field winding 41, conductors 42 and 49', switch 38, conductors 47 and 64, armature 45, conductors 44 and 43, switch 37, conductor 49, supply main L'. The branches of the relay circuit containing the coils 26 and 27 may include differently colored incandescent lamps 50 and 51, one or the other of which will light when the motor K is running and serve as a signal whereby the attendant may instantly learn whether the blowpipe B is being moved toward or away from the work W.

Thus the modification just described is capable of either raising or lowering the blowpipe and its flame relatively to the passing work. When radiant energy transmitted from the heated work to the photocell indicates that the weld is being overheated, the mechanism is actuated to automatically move the blowpipe away from the work to reduce its heating effect; and if this radiant energy through the photocell indicates that the weld is underheated, the mechanism will automatically move the blowpipe closer to the work to increase the applied heat.

In some instances it may be desirable to vary the quantity of heat applied to the weld by simultaneously controlling the quantity of gases supplied to the blowpipe and the position of the blowpipe and its flame with respect to the work. In such case the embodiments shown in Figs. 1 and 2 and described above are combined, as diagrammatically shown in Fig. 3, with portions of the electrical circuits omitted and like parts indicated by the same reference numerals. The gases may be supplied through conduits 95 and 96 and flexible tubing 95' and 96', respectively, to permit the blowpipe B to be raised or lowered by the control motor K. Two amplifying units A and A' may be connected through conductors 10 and 11 to the photocell C, the unit A being connected in the same manner as the unit illustrated in Fig. 1 to control the valves 97 and 98, and the unit A' being connected in the same manner as illustrated in Fig. 2 and described above to control the motor K and raise or lower the blowpipe B in accord with variations in the radiant energy emitted by the heated work. Thus the quality of the weld may be controlled by simultaneously varying the quantity of gases supplied to the blowpipe B and the position of the blowpipe and its flame with respect to the work.

In Fig. 4 we have diagrammatically illustrated a modification in which the welding operation is controlled by simultaneously varying the work-feeding speed and the quantity of gases supplied to the blowpipe B. In this embodiment the amplifying unit A is connected in the same manner as the unit A is connected in Fig. 1 to control the valves 97 and 98 and vary the quantity of gases supplied to the blowpipe B. The work-feeding speed may be controlled by an amplifying unit A'' which is connected through conductors 10 and 11 to the photocell C and arranged to effect the opening and closing of switches to instantly decrease or increase in the drive motor field circuit. As shown, the field leads 22, 23 of the drive motor M may include in series therewith a main adjustable resistance 53 and two fixed resistances 54 and 55. Normally the resistance 54 is cut out and the resistance 53 is so adjusted that the motor M will run at the proper speed to feed the work W at the rate required to produce a perfect weld at the beginning of the welding operation. As the welding proceeds, when a condition arises which results in overheating the metal at the weld, the resulting increase in radiant energy will be detected by the photocell C and cause the lever arm 19 to close the contacts 32 and 30, whereupon the energized coil 26 will open the switch 56 to insert the resistance 54 and thereby increase the motor speed sufficiently to restore the desired welding condition. On the other hand, should the radiant energy from the metal at the weld fall below the normal to indicate underheating, the lever arm 19 will move to open the contacts 30 and 32 and thereupon the deenergized coil 26 will release the switch 56 to cut out the resistance 54; and if the underheating continues the contacts 32 and 31 will close and the energized coil 27 will close the switch 57 to cut out the resistance 55 and thereby further reduce the drive motor speed sufficiently to restore the desired welding condition. If the work feeding speed gets too low and as the radiant energy from the melted metal increases, the contacts 32 and 31 will separate and the switch 57 will release to reinsert the resistance 55 and thereby instantaneously increase the work-feeding speed. Thus the photocell C, through the amplifying units A and A'', is effective to simultaneously control the quantity of gases supplied to the blowpipe B to regulate the quantity of heat applied to the weld and the rate at which the work W is moved past the blowpipe B.

In Fig. 5 there is diagrammatically shown another modification of our invention for simultaneously controlling the position of the blowpipe B and its flame with respect to the work and the speed of the driving motor M in accordance with variations in the amount of radiant energy emitted by the heat work. The amplifying unit A' is connected as shown in Fig. 2 and described above for controlling the motor K to raise or lower the blowpipe B; and the amplifying unit is connected to the field circuit of the driving motor M, as shown in Fig. 4 and described above, to control the speed at which the work W is moved past the blowpipe B.

While it is practicable and advantageous to focus a photocell on the molten weld metal puddle and thereby instantaneously regulate the welding speed in accord with changes in the radiant energy or the light intensity or color of the puddle, we have found that in multiple flame welding, wherein a series of heating jets may be successively applied to and along the edges to be welded, greater radiant energy changes occur a short distance ahead of the puddle. For this reason, in many instances it is preferable to focus the photocell upon a highly heated part of the metal edges a short distance ahead of the molten puddle, which part for convenience may be called the "guide point". For example, when machine welding a seam between thin sheet metal edges, using a multiple flame oxy-acetylene blowpipe, the welding flame which acts on the puddle produces a correctly penetrated weld when the successive heating flames are so arranged that the so-called rear preheating flame slightly melts the edges a short distance ahead of the welding flame. This rear preheating flame may be termed the "guide flame", and the "guide point" upon which the photocell is focused is preferably the slightly molten region along the seam immediately after the latter passes the "guide flame". When the photocell is properly focused on the "guide point", relatively great changes in radiant energy intensity are produced by the narrowing or widening of the molten metal zone at such point, which changes may be utilized in the control systems shown and described above. Hence, when the "guide flame" does not melt the sheet edges, the indications at the "guide point" are that the metal edges have not been sufficiently heated to permit the welding flame to produce a normal or fully penetrated weld, therefore the photocell instantaneously corrects this condition until the desired preheated condition is obtained; on the other hand, when there is too much melting by the "guide flame", the "guide point" indicates that the final weld will carry excessive weld penetration and the control system thereupon instantaneously responds to restore the desired welding condition.

The procedure just described is diagrammatically illustrated in Fig. 7, wherein a weld of the preferred normal penetration is represented in process of formation. The edges $x$, $y$, of the metal plate, pipe or similar sections X, Y, are disposed in abutting or slightly separated relation to provide the seam S to be welded. The finished part of the weld is shown at Z and the molten puddle at P. The number of oxy-acetylene flames applied to the seam by the multiple flame blowpipe may vary; as shown, a welding flame 60 may play directly onto the puddle, a rear preheating or guide flame 61 may slightly melt the unwelded edges a short distance away from the puddle, and a pair of forward preheating flames 62 and 63 may apply heat to the unwelded edges a short distance back from the seam and before such edges pass under the guide flame. As indicated at 64, the photocell focusing tube may have an elongated aperture which extends across the seam at the guide point between the flames 60 and 61 to receive radiant energy from the slightly molten edges and the highly heated adjoining metal and transmit such energy to the photocell. The blowpipe producing the flames 60, 61, 62, 63 and the focusing tube having the aperture 64 may be stationary, while the work sections X and Y may be fed together lengthwise of the seam, as indicated by the arrow; whereupon the photocell and control systems described above will automatically operate to produce a uniform continuous weld.

We have disclosed in detail several embodiments of our invention for the purpose of illustrating its broad principles. These principles, while particularly advantageous in fusion welding, may also be employed in uniting metals by brazing and silver soldering; in co-called forge welding wherein, for example, skelp heated in a furnace to a welding temperature may be drawn or fed through a suitable die or pressure-applying means and butt-welded or lap-welded, with or without supplemental heating at or near the welding point; in cutting materials, such as so-called metal cutting with the oxy-acetylene cutting flame consisting of gaseous heating and oxidizing jets; and in heat treating metals, as for example, in feeding a rod or wire past heating means or through an annealing furnace, the photocell of the feed or heat control mechanism in each instance being focused on the highly heated metal undergoing treatment. The source of heat employed for these purposes may be either a gaseous heating flame or an electric heating current or both. The photocell or radiant energy responsive means, instead of being focused on or applied to the outside of the work as shown in Fig. 1, may be focused on the bottom or inner side of the seam adjacent the welding point; the light conveyor tube C being suitably supported inside the tube W and directed on a highly heated zone on the opposite side of the seam from the heating flame or arc. The aperture of the conveyor tube may be of a shape which exposes both the guide point and part of the weld puddle to the photocell, and the latter may receive its radiant energy either directly or through a system of prisms. While we prefer to automatically regulate the operations disclosed by means of the well-known bulb type photocell, we may use the selenium cell instead; and in place of these we may use a device, such as an electrical pyrometer, which is responsive to changes in the temperature of the molten weld metal. Other modifications may be made in the details of the disclosed methods and mechanisms without departing from the principles of our invention or sacrificing its advantages.

What is claimed is:

1. The combination of heating means; mechanism whereby said heating means and the work heated thereby are movable relatively to one another to progressively heat such work; and means, responsive to changes in radiant energy emitted by the heated work, whereby the heating means is movable toward and away from the work to control the quantity of heat supplied thereto.

2. The combination of a blowpipe; gas-supply means connected to said blowpipe; mechanism whereby said blowpipe and the work heated thereby are movable relatively to one another to progressively heat such work; and means, responsive to changes in radiant energy emitted by the heated work, whereby the amount of gas supplied to said blowpipe is regulated to control the quantity of heat applied to the work.

3. Apparatus comprising the combination of means for heating work, means for varying the amount of heat supplied by said heating means, means for moving said heating means to and from the work, means for relatively moving said heating means and the work to heat successive portions of the work, and means including a device responsive to changes in a thermal condition of such heated portions for simultaneously controlling said heat-varying means and said first-mentioned moving means to regulate the quantity of heat supplied by said heating means and to change the position of said heating means with respect to the work.

4. Apparatus according to claim 3, in which said device is responsive to variations in radiant energy emitted from said heated portions of the work.

5. Apparatus according to claim 3, in which said means for heating work comprises a blowpipe and a source of combustible gas connected thereto and in which said means for varying the amount of heat supplied by said heating means comprises means for regulating the quantity of combustible gas supplied to said blowpipe.

6. Apparatus comprising the combination of means for heating work, means for varying the amount of heat supplied by said heating means, means for relatively moving said heating means and the work to heat successive portions of the work, and means including a device responsive to changes in a thermal condition of such heated portions for simultaneously controlling said heat-varying means and said moving means to regulate the quantity of heat supplied by said heating means and to change the rate of relative movement of said heating means and the work.

7. Apparatus according to claim 6, in which said device is responsive to variations in radiant energy emitted from said heated portions of the work.

8. Apparatus according to claim 6, in which said means for heating work comprises a blowpipe and a source of combustible gas connected thereto and in which said means for varying the amount of heat supplied by said heating means comprises means for regulating the quantity of combustible gas supplied to said blowpipe.

9. Apparatus comprising the combination of means for heating work, means for moving said heating means to and from the work, means for relatively moving said heating means and the work to heat successive portions of the work, and means including a device responsive to changes in a thermal condition of such heated portions for simultaneously controlling both of said moving means to change the position of said heating means with respect to the work and to regulate the rate of relative movement between said heating means and the work.

10. Apparatus according to claim 9, in which said device is responsive to variations in radiant energy emitted from said heated portions of the work.

11. Apparatus according to claim 9, in which said means for heating work comprises a blowpipe and a source of combustible gas connected thereto.

12. The combination with a source of heat adapted to be concentrated on relatively small areas of metal work, of mechanism for moving said work relatively to said source of heat for heating successive small areas of said work, and means responsive to changes in radiant energy emitted from the successive small heated areas of said work for moving said source of heat toward and away from said work to control the quantity of heat applied thereto.

13. The combination of a blowpipe for delivering a gaseous heating jet adapted to be concentrated on relatively small areas of metal work; gas-supply means connected to said blowpipe; mechanism whereby said blowpipe and said work are movable relatively to one another to heat successive portions of said work; and means, responsive to changes in radiant energy emitted from the successive small areas of said work when they become heated, whereby the amount of gas supplied to said blowpipe is regulated to control the quantity of heat applied to the successive small areas of said work.

14. Apparatus comprising the combination of means for heating relatively small areas of metal work; means for varying the amount of heat supplied by said heating means, means for relatively moving said heating means and said work to heat successive small areas of said work, and means including a device responsive to changes in radiant energy emitted from successive small areas of said work when they become heated for simultaneously controlling said heat-varying means and said moving means to regulate the quantity of heat supplied by said heating means to successive small areas of said work and to change the rate of relative movement of said heating means and said work.

15. Apparatus according to claim 14, in which said means for heating relatively small areas of said work comprises a blowpipe and a source of combustible gas connected thereto, and in which said means for varying the amount of heat supplied by said heating means comprises means for regulating the quantity of combustible gas supplied to said blowpipe.

16. Apparatus comprising the combination of means for heating relatively small areas of metal work, means for moving said heating means toward and away from said work, means for relatively moving said heating means and said work to heat successive small areas of said work, and means including a device responsive to changes in radiant energy emitted from the successive small areas of said work when they become heated for simultaneously controlling both of said moving means to change the position of said heating means with respect to said work and to regulate the rate of relative movement between said heating means and said work.

17. The combination of means for applying a high temperature heating flame locally to a surface portion of metal work, means for relatively moving said means and said work to apply said high temperature heating flame to successive portions of the work along a predetermined path, and means, responsive to radiant energy emitted from the successive locally heated surface portions when the high temperature heating flame is applied thereto, for moving said first-mentioned means toward and away from said work to control the quantity of heat supplied thereto.

18. Process of welding or cutting metal work which includes the steps of locally and progressively applying a high temperature heating flame to and along such work to produce a weld or a cut, and varying the size of said high temperature heating flame in accordance with changes in radiant energy emitted from a heated portion of the work adjacent the welding point or cutting point.

19. Process of welding or cutting metal work which includes the steps of utilizing a heating medium for locally and progressively applying heat to and along such work to produce a weld or a cut, and moving such heating medium toward and away from said work in accordance with changes in radiant energy emitted from a heated portion of said work adjacent the welding point or cutting point.

20. Apparatus for welding pipe comprising a torch for supplying heat to the pipe to be welded, means for varying the amount of heat supplied to the pipe by said torch, means for moving the pipe relatively to said torch whereby successive portions of said pipe are heated and means including a photoelectric cell so disposed as to be responsive to variations in amount of radiant energy emitted by the heated portion of the pipe for controlling said varying means to regulate the quantity of heat supplied to said pipe.

JAMES H. BUCKNAM.
LLOYD W. YOUNG.